US008014145B2

(12) United States Patent
Ho

(10) Patent No.: US 8,014,145 B2
(45) Date of Patent: Sep. 6, 2011

(54) COOLING PLATE FOR A NOTEBOOK

(75) Inventor: Chi-Pei Ho, Hsi-Chih (TW)

(73) Assignee: Aidma Enterprise Co., Ltd., Taipei Hsien (TW)

( * ) Notice: Subject to any disclaimer, the term of this patent is extended or adjusted under 35 U.S.C. 154(b) by 252 days.

(21) Appl. No.: 12/548,529

(22) Filed: Aug. 27, 2009

(65) Prior Publication Data

US 2010/0254082 A1 Oct. 7, 2010

(30) Foreign Application Priority Data

Apr. 6, 2009 (TW) .............................. 98205480 U

(51) Int. Cl.
| | |
|---|---|
| H05K 5/00 | (2006.01) |
| H05K 7/20 | (2006.01) |
| A47B 77/08 | (2006.01) |
| A47G 29/00 | (2006.01) |

(52) U.S. Cl. .............. 361/679.48; 361/695; 361/679.46; 174/16.1; 454/184; 312/236; 248/346.01; 248/349.1

(58) Field of Classification Search .................. 361/688, 361/690–691, 694–695, 679.46, 679.48–679.49; 165/80.2–80.3; 174/15.1, 16.1, 547, 252; 454/184; 312/236; 710/303, 304

See application file for complete search history.

(56) References Cited

U.S. PATENT DOCUMENTS

| 7,333,327 | B1 | | 2/2008 | Ho et al. | |
|---|---|---|---|---|---|
| D619,139 | S | * | 7/2010 | Ho .............................. | D14/447 |
| 2007/0221811 | A1 | * | 9/2007 | Hauser et al. ................ | 248/454 |
| 2008/0037213 | A1 | * | 2/2008 | Haren .......................... | 361/687 |
| 2009/0002932 | A1 | * | 1/2009 | Lord et al. .................... | 361/683 |
| 2010/0006735 | A1 | * | 1/2010 | Reinen ......................... | 248/451 |
| 2010/0226088 | A1 | * | 9/2010 | Huang ..................... | 361/679.48 |
| 2010/0288902 | A1 | * | 11/2010 | Liu ............................ | 248/349.1 |
| 2011/0073278 | A1 | * | 3/2011 | Ting ............................ | 165/80.2 |

\* cited by examiner

*Primary Examiner* — Zachary M Pape
(74) *Attorney, Agent, or Firm* — Alan Kamrath; Kamrath & Associates PA

(57) ABSTRACT

A cooling plate for a notebook comprises a base, a deck, a support jig, and a mouse piece, wherein the base is axially connected with the deck and includes an air hole formed thereon, the air hole includes a fin and a fixing panel connected therewith, the base also includes a recessed opening adjacent to the air hole, the deck includes a chamber formed on a middle portion thereof and having a number of positioning tabs attached on two sides of the chamber individually, and includes two covers disposed on two sides thereof respectively, each cover includes a cut mounted on an inner side thereof and a plurality of engaging protrusions adjacent to an inner side of a bottom surface thereof, the support jig is pivotally disposed in the opening of the base, and the support jig includes two retaining foots arranged on two sides of the rear end thereof.

9 Claims, 10 Drawing Sheets

COOLING PLATE FOR A NOTEBOOK

BACKGROUND OF THE INVENTION

1. Field of the Invention

The present invention relates to a cooling plate, and more particularly a cooling plate for a notebook that can adjust angle and cool heat.

2. Description of the Prior

With technology development, various notebooks with different sizes can be selected by consumers. A popular notebook is light weight, easy-carrying, and small size, however, as it is placed on a desk or thighs, the heat generating from an interior of the notebook can not be ventilated, causing overheat. Furthermore, most notebooks contact with the desk during operation, a suitable operating angle can not be adjusted, having uncomfort.

To improve above-mentioned defects, an easy-carrying support plate is disclosed in TW Pat. No. M3 0 6 6 7 7 (the same application as U.S. Pat. No. 7,333,327B1) that includes a panel to hold a notebook having at least one through hole; a deck, one end of which is axially connected with the panel, and another end of which includes a plurality of insertion bores; a support arm pivotally coupled to the deck and including at least one supporting member passing through the through hole of the panel, disposed on one end thereof, and extending outward to support the notebook; a reinforcing piece, one end of which is axially connected to a bottom surface of the panel, and another end of which is inserted in the insertion bore of the deck, such that the support plate is stored in a suitcase in a flat surface shape to be carried easily.

However, such an improved notebook still has some disadvantages as follows:

1. After adjusting the panel toward an angle, the panel can not be positioned, therefore the support plate has to be inserted to a suitable insertion bore of the deck again. Beside, during moving the notebook, because the panel is not positioned to the deck, the panel rotates outward from the deck randomly.

2. The through holes of the panel can not ventilate heat resulting from the interior of the notebook, causing overheat.

The present invention has arisen to mitigate and/or obviate the afore-described disadvantages.

SUMMARY OF THE INVENTION

The primary object of the present invention is to provide a cooling plate for a notebook that as adjusting the angle of the base, the spaced positioning tabs and the engaging protrusions form the sawtoothed adjusting path to adjust the base in order, and as moving the base, the covers and the stop projections engage with the support jig, and the support jig makes the base and the deck keep at an original set angle to move the cooling plate easily.

A further object of the present invention is to provide a cooling plate for a notebook that includes a base having an air hole and an opening, and a fin is connected with the air hole to blow and ventilate heat, thus cooling heat energy effectively.

Another object of the present invention is to provide a cooling plate for a notebook that can prevent the notebook from movement on the thighs.

A cooling plate for a notebook according to a preferred embodiment of the present invention comprises:

a base, a deck, a support jig, and a mouse piece, wherein the base is axially connected with the deck to be rotated axially and includes an air hole formed in a central portion thereof and a recessed opening adjacent to the air hole, the air hole includes a fin and a fixing panel connected therewith, the base also includes two pads, each having a plurality of bosses thereon, mounted on two sides of a top surface thereof and includes a stopping member fixed on a front side of the top surface thereof and includes a holding bore arranged on a rear side of the top surface thereof, the deck includes a chamber formed on a middle portion thereof and having a number of positioning tabs attached on two sides of the chamber individually, and includes two covers disposed on two sides thereof respectively, and between each cover and the chamber is defined a sliding way, the cover includes a cut mounted on an inner side thereof and a plurality of right-triangle engaging protrusions adjacent to an inner side of a bottom surface thereof to be spaced apart from the positioning tabs, the deck also includes two recesses fixed on two sides thereof individually and first and second anti-slip members attached on four corners thereof respectively, each of the first and second anti-slip members includes a hook and loop fastener secured therein and the deck further includes a holding slot arranged on a rear side thereof, a front end of the support jig is pivotally disposed in the opening of the base, and the support jig includes two retaining foots arranged on two sides of the rear end thereof, the mouse piece is stored in the chamber of the deck.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
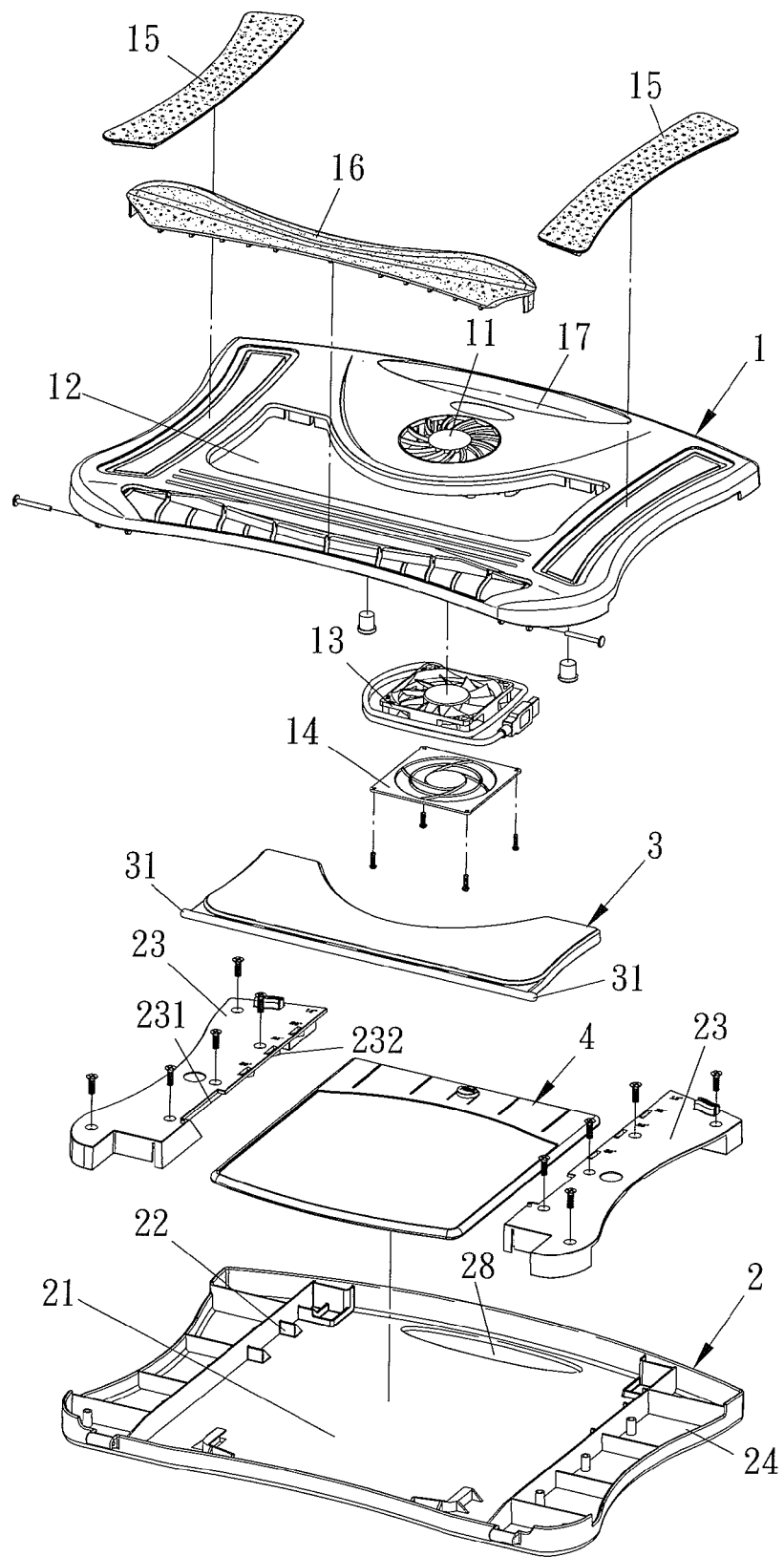
FIG. 1 is a perspective view showing the exploded components of a cooling plate for a notebook in accordance with a preferred embodiment of the present invention.
Figure 2:
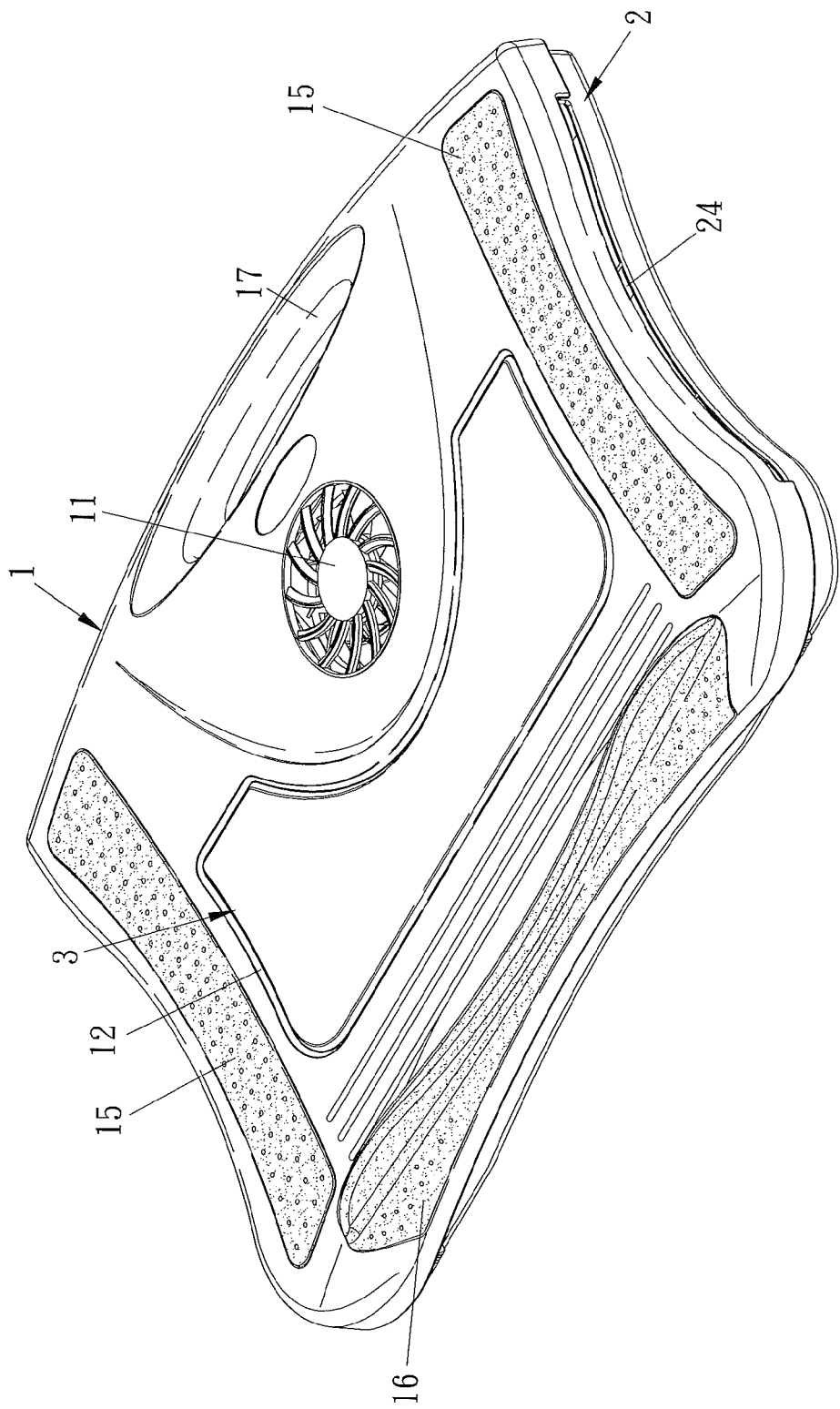
FIG. 2 is a perspective view showing the assembly of the cooling plate for the notebook in accordance with the preferred embodiment of the present invention.
Figure 3:
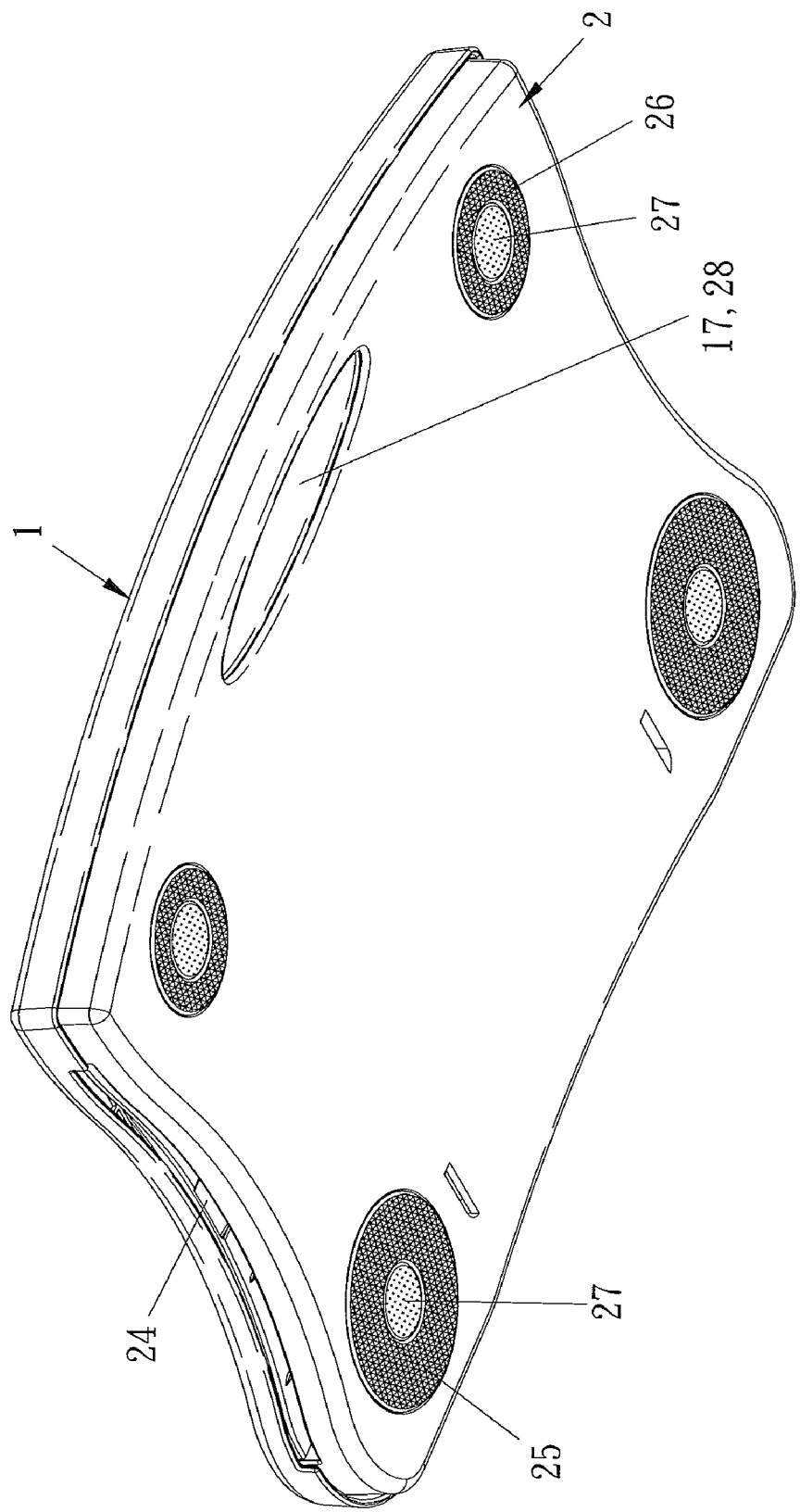
FIG. 3 is a bottom plan view showing the assembly of the cooling plate for the notebook in accordance with the preferred embodiment of the present invention.

Referring to FIGS. 1-3, a cooling plate for a notebook according to a preferred embodiment of the present invention comprises a base 1, a deck 2, a support jig 3, and a mouse piece 4, wherein the base 1 is axially connected with the deck 2 to be rotated axially and includes an air hole 11 formed in a central portion thereof and a recessed opening 12 adjacent to the air hole 11, the air hole 11 includes a fan 13 and a fixing panel 14 connected therewith, the base 1 also includes two pads 15, each having a plurality of bosses thereon, mounted on two sides of a top surface thereof and includes a stopping member 16 fixed on a front side of the top surface thereof and includes a holding bore 17 arranged on a rear side of the top surface thereof, the deck 2 includes a chamber 21 formed on a middle portion thereof and having a number of positioning tabs 22 attached on two sides of the chamber 21 individually, and includes two covers 23 disposed on two sides thereof respectively, and between each cover 23 and the chamber 21 is defined a sliding way, the cover 23 includes a cut 231 mounted on an inner side thereof and a plurality of right-triangle engaging protrusions 232 adjacent to an inner side of a bottom surface thereof to be spaced apart from the positioning tabs 22, the deck 2 also includes two recesses 24 fixed on two sides thereof individually and first and second anti-slip members 25, 26 attached on four corners thereof respectively, each of the first and second anti-slip members 25, 26 includes a hook and loop fastener 27 secured therein and the deck 2 further includes a holding slot 28 arranged on a rear side thereof, a front end of the support jig 3 is pivotally disposed in the opening 12 of the base 1, and the support jig 3 includes two retaining foots 31 arranged on two sides of the rear end thereof, the mouse piece 4 is stored in the chamber 21 of the deck 2.

Figure 4:
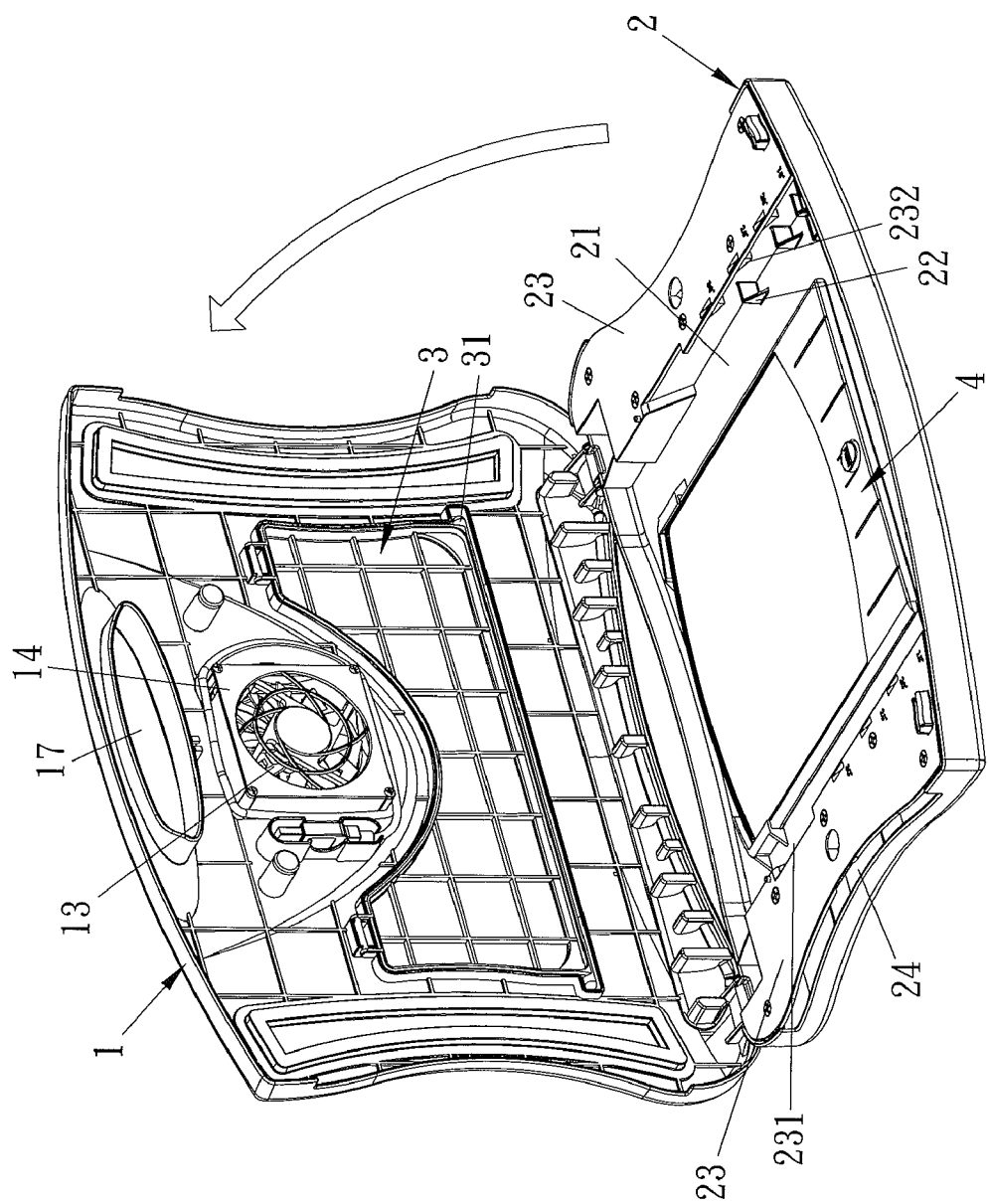
FIG. 4 is a perspective view showing a base being rotated upward.
Figure 5:
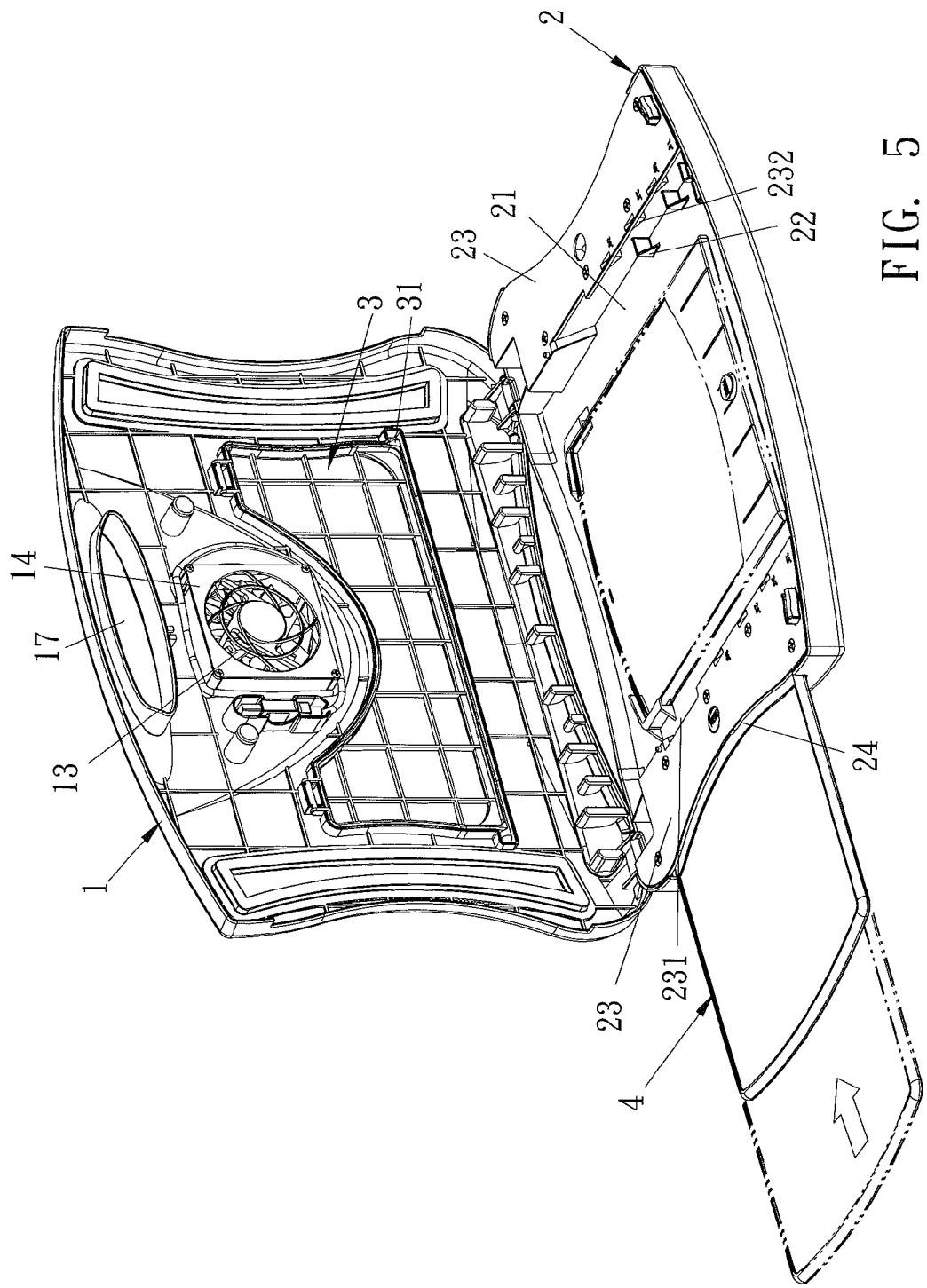
FIG. 5 is a perspective view showing a mouse piece being inserted to a recess of a deck.
Figure 6:
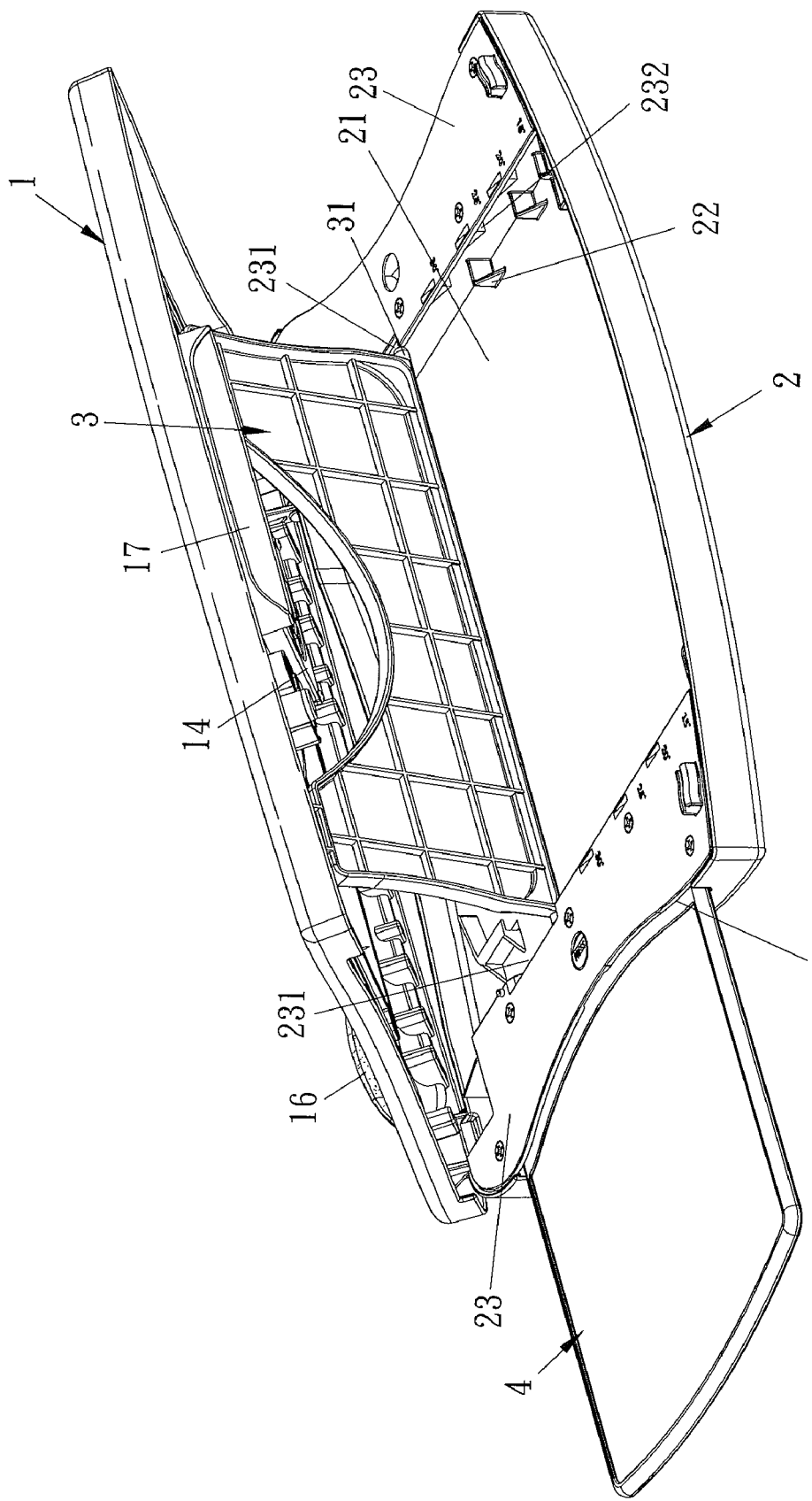
FIG. 6 is a perspective view showing a support jig being retained to a sliding way.
Figure 7:
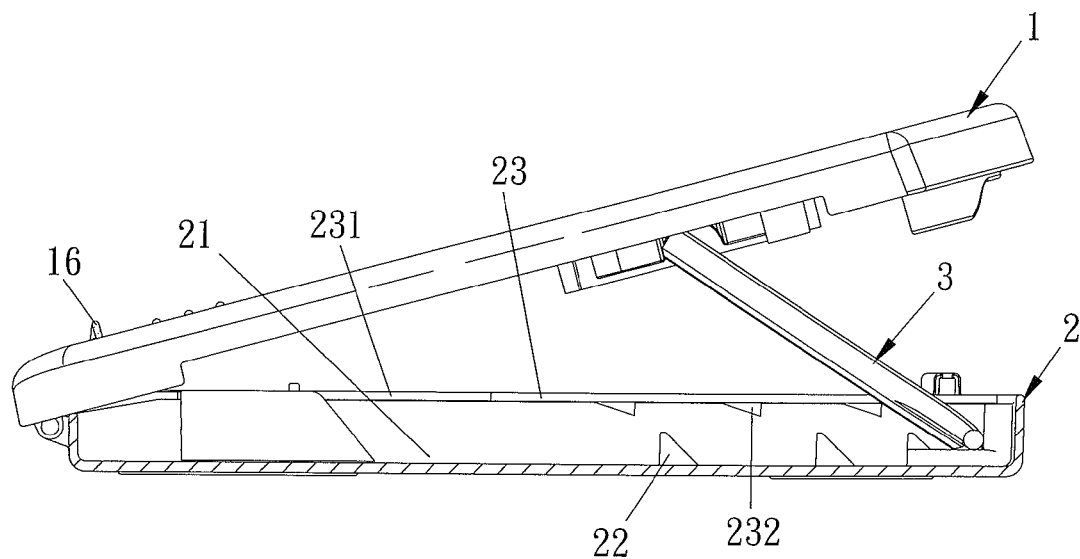
FIG. 7 is a cross sectional view showing the operation of the cooling plate for the notebook in accordance with the preferred embodiment of the present invention.
Figure 8:
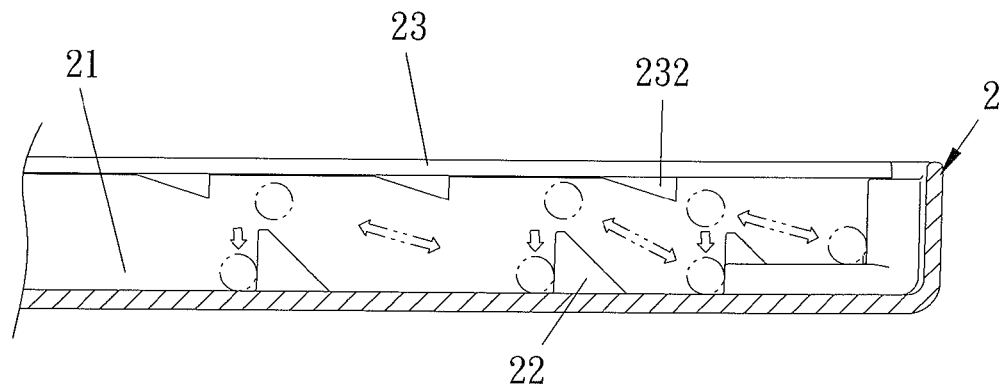
FIG. 8 is a cross sectional view showing the base being adjusted to a suitable angle.
Figure 9:
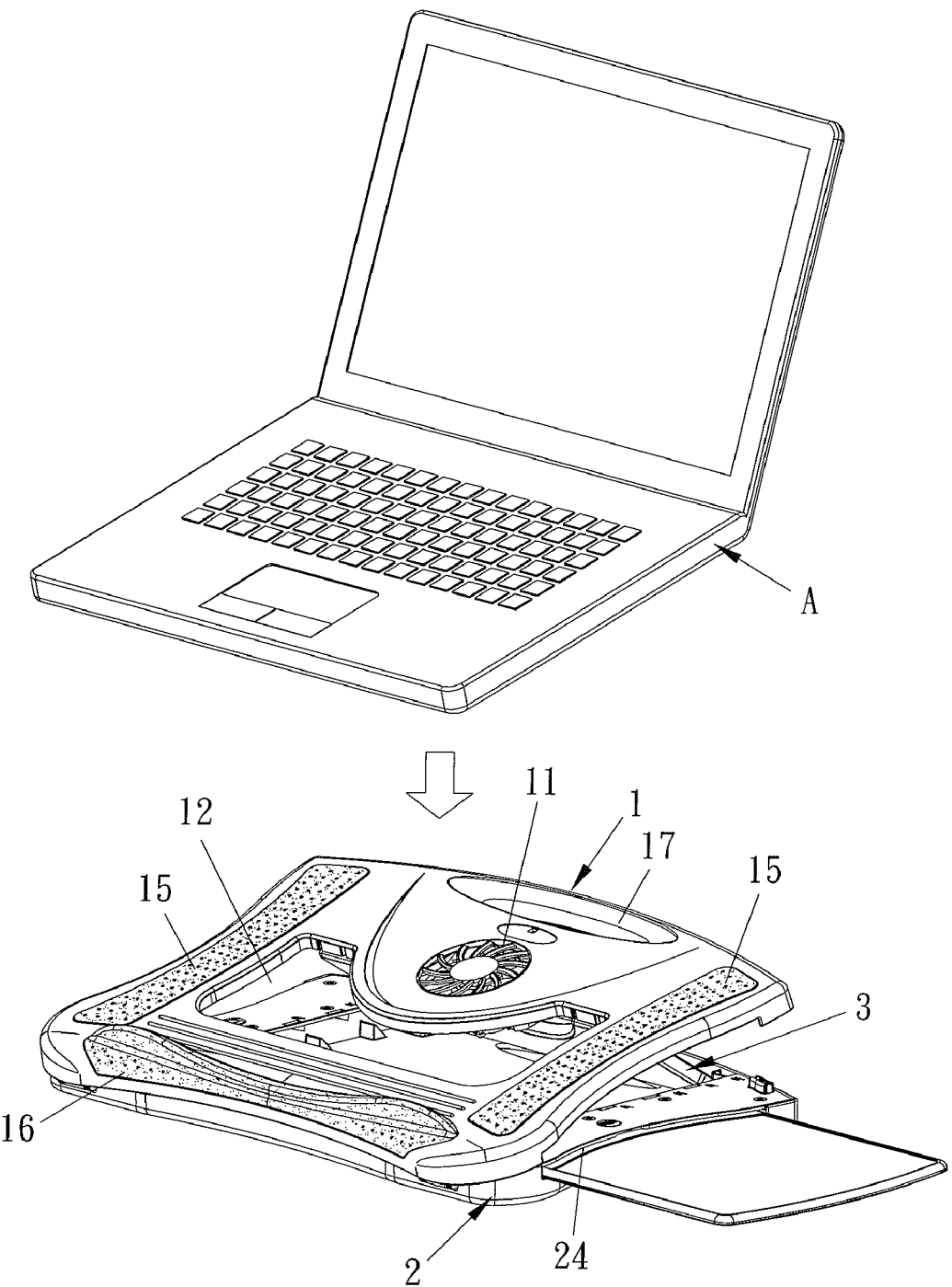
FIG. 9 is a perspective view showing the notebook being placed onto the cooling plate of the present invention.
Figure 10:
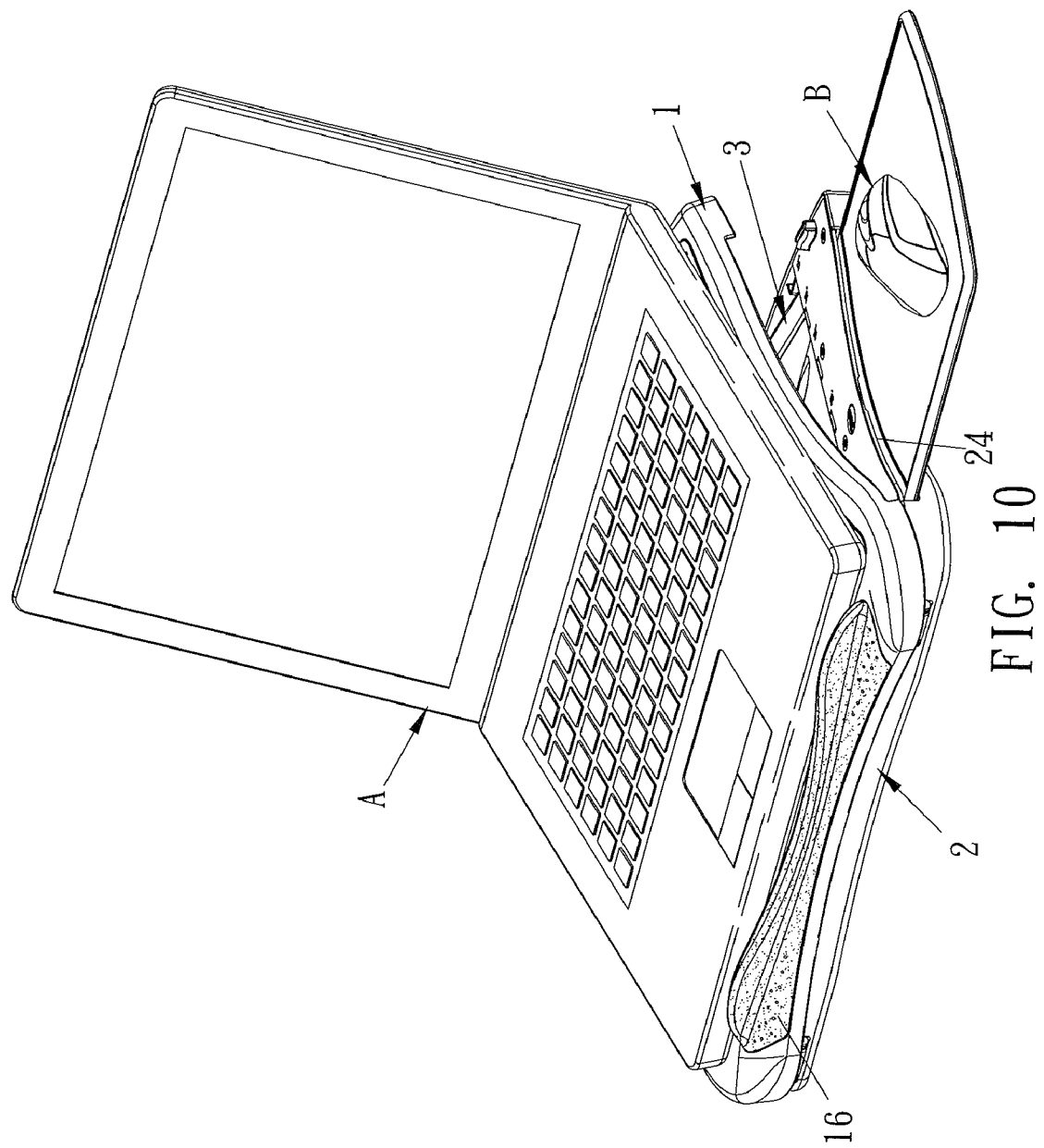
FIG. 10 is a perspective view showing the cooling plate of the present invention being used to hold the notebook.

In operation, as shown in FIGS. 4 and 5, the base 1 is rotated upward to take the mouse piece 4 out of the chamber 21 of the deck 2, and then the mouse piece 4 is inserted to the recess 24 of the deck 2. Thereafter, as illustrated in FIGS. 6-8, the support jig 3 is rotated inward so that the retaining foots 31 enter to the sliding way between the cover 23 and the chamber 21 from the cut 231 to be retained on the positioning tabs 22, thus tilting the base 1 toward a required angle. It is to be noted that the spaced positioning tabs 22 and the engaging protrusions 232 form a sawtoothed adjusting path to adjust the support jig 3. Referring to FIGS. 9 and 10, a notebook A is placed onto the base 1, the pads 15 and the stop projections 16 of the base 1 can provide an anti-slip effect, positioning the notebook A on the base 1 securely. Thereafter, the fan 13 blows heat from the air hole 11 and the opening 12 ventilates heat, thereby cooling heat. In addition, a mouse B is placed onto the mouse piece 4 to operate the notebook easily.

As moving the cooling plate to other positions, the base 1 is held and the covers 23 and the engaging protrusions 232 engage with the retaining foots 31 of the support jig 3 so that the base 1 does not rotate relative to the deck 2. Thereafter, the base 1 is released to return the original angle.

Figure 11:
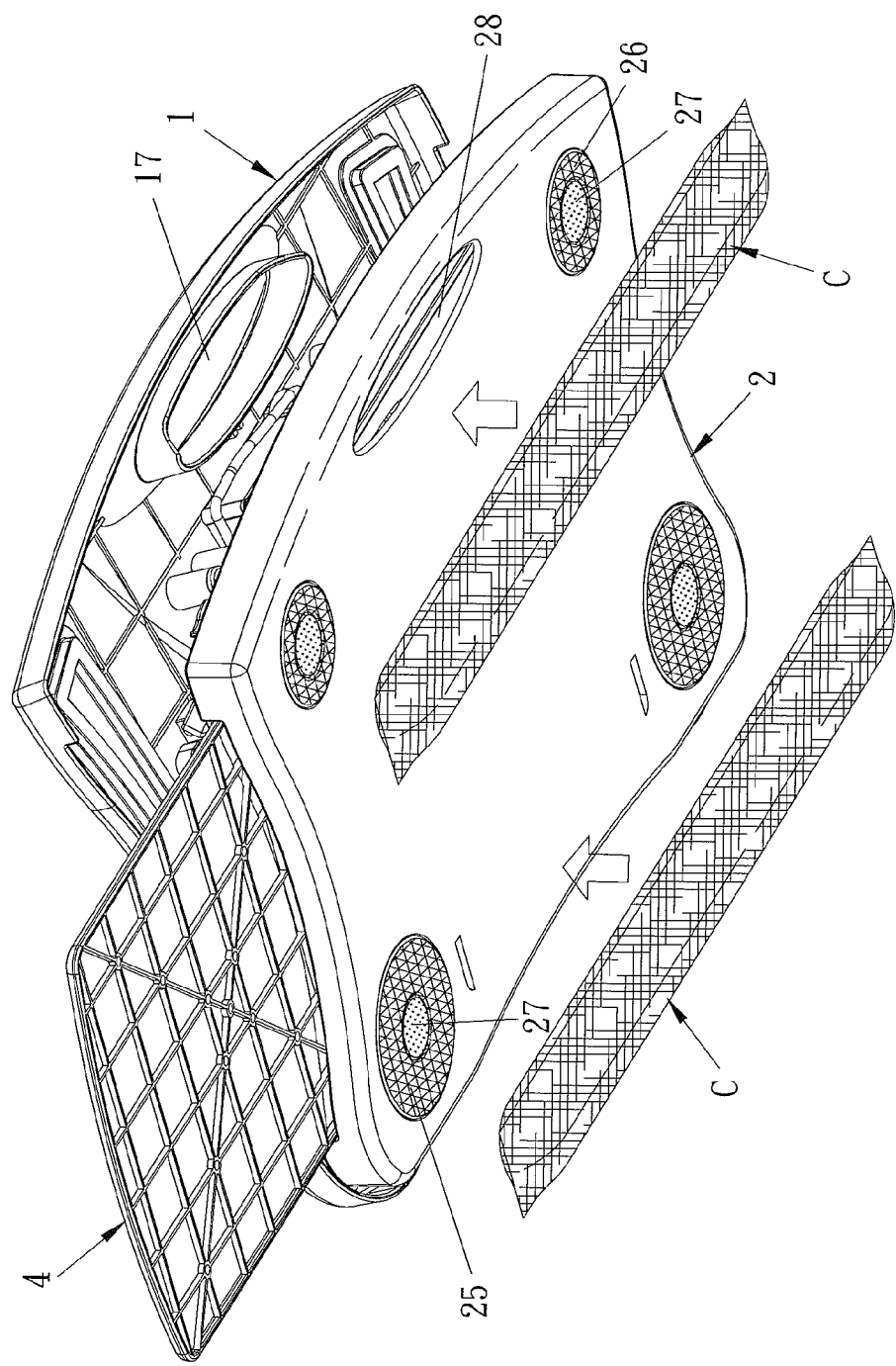
FIG. 11 is a perspective view showing a plurality of anti-slip members each having a hook and loop fastener therein being attached to a bottom surface of the cooling plate.

When placing the notebook to thighs, as shown in FIG. 11, the hook and loop fasteners 27 of the deck 2 or soft cushions C can prevent the notebook from movement on the thighs.

It is apparent form the above description that the cooling plate for the notebook of the present invention has the following advantages:

1. As adjusting the angle of the base 1, the spaced positioning tabs 22 and the engaging protrusions 232 form the sawtoothed adjusting path to adjust the base 1 in order, and as moving the base 1, the covers 23 and the stop projections 232 engage with the support jig 3, and the support jig 3 makes the base 1 and the deck 2 keep at an original set angle to move the cooling plate easily.

2. The base 1 includes the air hole 11 and the opening 12, and the fan 13 is connected with the air hole 11 to blow and ventilate heat, cooling heat energy effectively.

3. The deck 2 includes the hook and loop fasteners 27 disposed on four corners thereof respectively to attach with two soft cushions C, thereby preventing the notebook from movement on the thighs.

While we have shown and described various embodiments in accordance with the present invention, it is clear to those skilled in the art that further embodiments may be made without departing from the scope of the present invention.

What is claimed is:

1. A cooling plate for a notebook comprising:
a base, a deck, a support jig, and a mouse piece, wherein the base is axially connected with the deck and includes an air hole formed thereon, the air hole includes a fin and a fixing panel connected therewith, characterized that:
the base also includes an opening adjacent to the air hole, and the deck includes a chamber formed in a middle portion thereof and having a number of positioning tabs attached on two sides of the chamber individually, and includes two covers disposed on two sides thereof respectively, each cover includes a cut mounted on an inner side thereof and a plurality of engaging protrusions adjacent to an inner side of a bottom surface thereof, the support jig is pivotally disposed in the opening of the base, and the support jig includes two retaining foots arranged on two sides of the rear end thereof individually, such that the retaining foots engage with the positioning tabs of the deck positioning the base at a suitable angle.

2. The cooling plate for the notebook as claimed in claim 1, wherein the opening of the base is formed in a recess shape.

3. The cooling plate for the notebook as claimed in claim 1, wherein the base also includes two pads, each having a plurality of bosses thereon, mounted on two sides of a top surface thereof and includes a stopping member fixed on a front side of the top surface thereof.

4. The cooling plate for the notebook as claimed in claim 1, wherein the engaging protrusions of the deck are spaced apart from the positioning tabs.

5. The cooling plate for the notebook as claimed in claim 1, wherein the engaging protrusions are formed in a right triangle shape.

6. The cooling plate for the notebook as claimed in claim 4, wherein the engaging protrusions are formed in a right triangle shape.

7. The cooling plate for the notebook as claimed in claim 1, wherein the deck includes two recesses fixed on two sides thereof individually.

8. The cooling plate for the notebook as claimed in claim 1, wherein the chamber of the deck is used to store the mouse piece.

9. The cooling plate for the notebook as claimed in claim 1, wherein the deck includes first and second anti-slip members attached on four corners thereof respectively, each of the first and second anti-slip members includes a hook and loop fastener secured therein.

* * * * *